US007842918B2

(12) United States Patent
Wang

(10) Patent No.: US 7,842,918 B2
(45) Date of Patent: Nov. 30, 2010

(54) CHEMICAL STRUCTURE-INSENSITIVE METHOD AND APPARATUS FOR DISSOCIATING IONS

(75) Inventor: Mingda Wang, Fremont, CA (US)

(73) Assignee: Varian, Inc, Santa Clara, CA (US)

( * ) Notice: Subject to any disclaimer, the term of this patent is extended or adjusted under 35 U.S.C. 154(b) by 354 days.

(21) Appl. No.: 11/715,199

(22) Filed: Mar. 7, 2007

(65) Prior Publication Data

US 2008/0217527 A1 Sep. 11, 2008

(51) Int. Cl.
*B01D 59/44* (2006.01)

(52) U.S. Cl. ....................... 250/290; 250/281; 250/282; 250/293

(58) Field of Classification Search ................. 250/282, 250/292, 281, 290, 293
See application file for complete search history.

(56) References Cited

U.S. PATENT DOCUMENTS

| | | | | |
|---|---|---|---|---|
| 4,736,101 | A | 4/1988 | Syka et al. | |
| 5,198,665 | A * | 3/1993 | Wells | 250/282 |
| 5,291,017 | A | 3/1994 | Wang et al. | |
| 5,300,772 | A | 4/1994 | Buttrill, Jr. | |
| 5,302,826 | A | 4/1994 | Wells | |
| 5,451,782 | A * | 9/1995 | Kelley | 250/282 |
| 5,521,380 | A | 5/1996 | Wells et al. | |
| 5,714,755 | A | 2/1998 | Wells et al. | |
| 5,793,038 | A | 8/1998 | Buttrill, Jr. | |
| 5,864,136 | A * | 1/1999 | Kelley et al. | 250/282 |
| 6,087,658 | A | 7/2000 | Kawato | |
| 6,124,591 | A | 9/2000 | Schwartz et al. | |
| 6,410,913 | B1 * | 6/2002 | Brekenfeld et al. | 250/282 |
| 6,617,585 | B1 * | 9/2003 | Stickel | 250/396 R |
| 6,710,336 | B2 | 3/2004 | Wells | |
| 6,831,275 | B2 | 12/2004 | Franzen et al. | |

(Continued)

FOREIGN PATENT DOCUMENTS

WO WO 2006/047889 A1 5/2006

OTHER PUBLICATIONS

Qin et al., "Matrix-Assisted Laser Desorption Iion Trap Mass Spectrometry: Efficient Isolation and Effective Fragmentation of Peptide Ions", Anal. Chem., vol. 68, pp. 2108-2112 (1996).

(Continued)

*Primary Examiner*—Bernard E Souw
*Assistant Examiner*—Michael J Logie
(74) *Attorney, Agent, or Firm*—Bella Fishman

(57) ABSTRACT

In a method for exciting a precursor ion in an ion trap, the ion is trapped in a nonlinear trapping field that includes a quadrupolar field and a multipole field. The quadrupolar field is generated by applying a radio-frequency (RF) trapping voltage to the ion trap at a trapping amplitude and trapping frequency. A supplemental alternating-current (AC) voltage is applied to the ion trap at a supplemental amplitude and supplemental frequency. The supplemental amplitude is low enough to prevent ejection of the ion from the ion trap, and the supplemental frequency differs from the secular frequency of the ion by an offset amount. One or more operating parameters of the ion trap are adjusted, such that the ion absorbs energy from the supplemental field sufficient to undergo collision-induced dissociation (CID) without being in resonance with the supplemental field.

19 Claims, 5 Drawing Sheets

U.S. PATENT DOCUMENTS

| | | | | |
|---|---|---|---|---|
| 6,897,438 | B2 | 5/2005 | Soudakov et al. | |
| 7,034,293 | B2 | 4/2006 | Wells | |
| 7,141,789 | B2 | 11/2006 | Douglas et al. | |
| 2004/0051036 | A1* | 3/2004 | Franzen et al. | 250/282 |
| 2004/0159785 | A1* | 8/2004 | Kato | 250/292 |
| 2005/0061966 | A1* | 3/2005 | Ding et al. | 250/288 |
| 2006/0169884 | A1* | 8/2006 | Syka | 250/282 |
| 2007/0075239 | A1* | 4/2007 | Ding et al. | 250/282 |
| 2007/0084994 | A1* | 4/2007 | Wang et al. | 250/282 |
| 2007/0176096 | A1* | 8/2007 | Wells | 250/292 |

OTHER PUBLICATIONS

Mirgorodskaya et al., "A General Method for Precalculation of Parameters for Sustained Off Resonance Irradiation/Collision-Induced Dissociation", American Society for Mass Spectrometry, Published Online Feb. 13, 2002.

Collings et al., "Resonant Excitation in a Low-Pressure Linear Ion Trap", American Society for Mass Spectrometry, Published Online May 2, 2003.

Michaud et al., "Ion Excitation in a Linear Quadrupole Ion Trap with an Added Octopole Field", American Society for Mass Spectrometry, Published Online May 3, 2005.

Collings, B. A., "Increased Fragmentation Efficiency of Ions in a Low Pressure Linear Ion Trap with an Added dc Octopole Field", American Society for Mass Spectrometry, Published Online Jun. 24, 2005.

Konenkov et al., "Linear Quadrupoles with Added Hexapole Fields", American Society for Mass Spectrometry, Published Online Jun. 5, 2006.

* cited by examiner

CHEMICAL STRUCTURE-INSENSITIVE METHOD AND APPARATUS FOR DISSOCIATING IONS

FIELD OF THE INVENTION

The present invention relates generally to the manipulation or processing of ions in electrode arrangements typically utilized as ion traps. More specifically, the invention relates to methods and apparatus for exciting one or more ions in an electrode structure under off-resonance excitation and non-linear trapping field conditions. The methods and apparatus may be implemented, for example, in conjunction with mass spectrometry-related operations including tandem and multi-stage mass spectrometry (MS/MS and $MS^n$). The ion excitation may be employed, for example, for collision-induced dissociation (CID).

BACKGROUND OF THE INVENTION

An ion-processing device operating as an ion trap is useful in mass spectrometry and other applications requiring the manipulation and control of ions, particularly ionized species of sample materials under investigation. Such an ion processing device may be formed by a three-dimensional (3-D) or two-dimensional (2-D, or "linear") arrangement of electrodes. In the case of a 3-D ion trap, the electrode set typically includes two opposing end caps spaced from each other along a central (z) axis, and a ring electrode symmetrically positioned between the end caps. The ring electrode has a cross-section annularly swept about the z-axis at a radial distance on a radial (r) axis orthogonal to the z-axis. In the case of a 2-D ion trap, the electrode set typically includes four electrodes coaxially arranged about a central (z) axis and elongated in the direction of the z-axis. Typically, each elongated electrode of the 2-D ion trap is positioned in an x-y plane orthogonal to the central z-axis at a radial distance (x or y) from the central z-axis, and typically runs parallel to the other electrodes of the same set. In both of the 3-D and 2-D cases, the inside surfaces of the electrodes are typically hyperbolic, with apices facing inwardly toward the 3-D center or 2-D central axis, to produce a pure quadrupolar electric field. In the 2-D case, however, the elongated electrodes may be cylindrical rods that approximate the ideal hyperbolic profiles. In both of the 3-D and 2-D cases, the resulting arrangement of electrodes defines an interior space generally bounded by the inside surfaces of the electrodes. In the 2-D case, the interior space is axially elongated along the z-axis as a result of the elongated dimensions of the electrodes along this same axis.

In operation, ions may be introduced, trapped, stored, isolated, fragmented, and subjected to various reactions in the interior space of the ion trap, and may be ejected from the interior space for detection. In the 3-D case, the excursions of ions in 3-space (resolved, for example, by cylindrical coordinates r and z) may be controlled by applying a 3-D AC trapping field potential to the electrode structure of the ion trap. The driving frequency of the trapping voltage typically falls within a range associated with the radio frequency (RF) spectrum. In the 2-D case, the radial excursions of ions along the x-y plane may be controlled by applying a 2-D AC (RF) trapping field potential between opposing pairs of electrodes. Additionally in the 2-D case, the axial excursions of ions, or the motion of ions along the central z-axis, may be controlled by applying an axial DC barrier potential between the axial ends of the electrodes. The impressing of the RF trapping voltage between the appropriate electrodes of the ion trap generates a quadrupolar electrical field that is symmetrical about the center of the 3-D ion trap or the central axis of the 2-D ion trap. The amplitude and frequency of the RF trapping voltage may be set such that ions of a desired range of mass-to-charge (m/z) ratios are constrained to orbits focused about the 3-D center or the 2-D central axis.

In addition to the RF trapping field, auxiliary or supplemental AC (which may also be RF) dipolar or quadrupolar excitation fields may be applied between at least one opposing pair of electrodes in either a 3-D or 2-D ion trap to increase the amplitudes of oscillation of ions of selected m/z ratios along the axis of that electrode pair. A supplemental AC field may be applied to increase the kinetic energies of ions for various purposes, including ion ejection and collision-induced dissociation (CID), also termed collision-activated dissociation (CAD). The supplemental AC field is typically applied so as to create a resonance condition in the ion trap at which an ion of a given m/z ratio efficiently takes up energy from the supplemental AC field. The resonance condition occurs when the secular frequency of the oscillation of an ion, in the direction of the axis along which the supplemental AC voltage is applied, matches the frequency of the applied supplemental AC voltage. The frequency of the supplemental AC voltage is typically set to about one-half or less of the frequency of the RF trapping voltage, and the amplitude of the supplemental AC voltage is typically set to a small percentage of the RF trapping voltage. Because the secular frequency of an ion of a given m/z ratio depends on the amplitude and frequency of the RF trapping voltage, the RF trapping voltage may be adjusted to bring that ion into resonance with the supplemental AC field. As an example, the RF trapping voltage may be set to 300 V at a driving frequency of 1.05 MHz, while the supplemental AC voltage may be set to 3.0 V at a resonant frequency of 485 kHz. The RF trapping voltage may then be scanned to shift the respective secular frequencies of ions of successive m/z ratios into equality with the 485-kHz frequency of the supplemental AC voltage, whereby the different ions become resonantly excited in mass-wise succession. Alternatively, instead of scanning the secular frequency of the ion to match up with a fixed-frequency supplemental AC voltage, the RF trapping voltage may be held constant while the frequency of the supplemental AC voltage is swept to the point where the resonance condition is fulfilled. Hence, ions of differing m/z ratios may be resonated in succession by ramping (or scanning) the amplitude or frequency of the RF trapping voltage or the frequency of the supplemental AC voltage.

Generally, a smaller supplemental AC voltage amplitude is utilized to excite ions for CID, whereby the amplitude of oscillation of the ions is increased enough to cause collisions with background gas molecules and consequently fragment or dissociate the ions into lower-mass species, but not enough to cause the ions to overcome the restoring forces imparted by the RF trapping field and be lost (e.g., by striking an electrode or being ejected from the ion trap). A supplemental AC voltage of greater amplitude (but still a small percentage of the RF trapping voltage amplitude) is utilized to excite ions enough to resonantly eject them from the ion trap. Thus, achieving high-efficiency CID conventionally has required a careful balancing of ion kinetic energy uptake so that the internal energy of a precursor ion accumulates sufficiently to cause dissociation while ejection of the precursor ions and fragment ions is prevented.

Ions present in the interior space of the electrode set are responsive to, and their motions influenced by, all electric fields active within the interior space. These fields include fields applied intentionally by electrical means as in the case of the above-noted AC (and optionally DC) fields, and fields mechanically (physically) generated due to the physical/geometric features of the electrode set. The mechanically generated fields may or may not be intentional and, depending on the mode of operation of the ion trap, may or may not be desirable or optimal. Both applied fields and mechanically generated fields are governed by the configuration (profile, geometry, features, and the like) of the inside surfaces of the electrodes exposed to the interior space. Points on the inside surfaces closest to the central axis, such as the apex of a hyperbolic end cap electrode (3-D case), or the apical line of a hyperbolic ring electrode (3-D case) or an elongated electrode (2-D case), have the greatest influence on an RF trapping field and thus on the ions constrained by the RF trapping field to the volume around the 3-D center or 2-D central axis of the interior of the ion trap.

In an ideal case, the 3-D or 2-D RF trapping field is purely quadrupolar. In a pure quadrupolar RF trapping field, no higher-order multipole fields are present and the secular frequency of oscillation of an ion in a given coordinate direction is independent of the secular frequency of oscillation in an orthogonal coordinate direction. The ion's secular frequency is also independent of the amplitude of the ion's oscillation. Moreover, the strength of the ideal quadrupolar field increases linearly with distance from the center of a 3-D ion trap, or from the central axis of a 2-D ion trap along either the x-axis or the y-axis. The electrodes of many conventional ion traps are hyperbolically shaped and spaced from each other so as to approach the ideal case as close as possible and thus minimize distortions in the quadrupolar field caused by multipole moments. The use of a pure quadrupolar trapping field simplifies the ejection of ions from the ion trap. This is because in the symmetrical quadrupolar case, increasing the motion of an ion in one component direction does not affect the motion of the ion in an orthogonal direction. Thus, a supplemental AC dipole may be utilized to eject an ion only along the axis of the opposing end caps of a 3-D electrode structure or along the axis between one pair of opposing elongated electrodes of a 2-D electrode structure.

On the other hand, in a trapping field consisting of a quadrupolar field that is distorted by the superposition of a multipole field, the motion of an ion in one direction may be coupled to the motion of the ion in an orthogonal direction. Moreover, the secular frequency of the ion in a combined field consisting of both quadrupolar and higher-order multipole components becomes a function of the position of the ion in the ion trap. As the amplitude of an ion's oscillation increases in response to the resonance condition promoted by the supplemental AC field, the presence of a higher-order multipole may cause the ion to shift out of resonance, thereby complicating the use of resonance excitation techniques. Thus, significant multipoles in the trapping field are typically avoided, although some recently developed techniques deliberately take advantage of the nonlinear resonance conditions enabled by multipoles. See, e.g., U.S. Pat. No. 7,034,293, commonly assigned to the assignee of the present disclosure.

In a known method for carrying out CID, an RF trapping voltage is applied to a 3-D ion trap to trap stable ions. Then all ions outside of a desired mass or mass range are expelled from the electrode structure by implementing an isolation technique. The isolated ions having the selected m/z ratio (a precursor or parent ion) are then dissociated. For example, a supplemental AC dipole voltage may be applied to the end caps at a supplemental frequency that matches the secular frequency of the ion mass of interest corresponding to motion of that ion along the z-axis, i.e., the axis along which the end caps lie and the dipole is imposed. The matching of the supplemental excitation frequency with the secular frequency creates a resonance condition, by which the ion of interest efficiently picks up energy and collides with molecules of a background gas, thereby fragmenting into product (e.g., daughter) ions. The operating parameters of the RF trapping voltage are selected such that the product ions are retained in the ion trap. The amplitude of the RF trapping voltage is then scanned (ramped up) to eject product ions in mass-wise succession from the ion trap along the axis of the end caps (e.g., z-axis). The detection of the ejected product ions enables the generation of a mass spectrum. An example of this technique is described in U.S. Pat. No. 4,736,101.

One problem with this technique is that, generally, the secular frequency of a given ion of interest cannot be precisely determined in advance. Thus, the technique is unable to deliver consistent CID performance. In addition, the supplemental AC voltage needs to be optimized individually for different ions of interest because the energy required for CID depends on the particular compound (chemical structure) to be fragmented.

Another method for carrying out CID is described in U.S. Pat. No. 5,302,826 ("the '826 Patent"), commonly assigned to the assignee of the present disclosure. As taught in the '826 Patent, after isolating a precursor (parent) ion of interest, a supplemental AC excitation voltage is applied in combination with a low-frequency (e.g., 500 Hz) signal during the CID stage. The low-frequency signal modulates the amplitude of the applied RF trapping voltage. As a result, ion secular frequency matches up with the supplemental excitation frequency periodically. In this manner, the exact supplemental excitation frequency required for CID need not be known. However, the amplitude of the supplemental excitation voltage still needs to be optimized for individual ions of interest.

In another method for carrying out CID via resonance excitation, described in U.S. Pat. No. 6,124,591, the amplitude of the excitation voltage applied to the ion trap is linearly related to the m/z ratio of the ion to be fragmented for a particular ion trap instrument. A calibration process is employed to calibrate the linear relationship on a per instrument basis. However, the amplitude of the supplemental excitation voltage still needs to be optimized for individual ions of interest if their chemical structures are different from that of the ion of the calibrant compound upon which the calibration was based.

Another method for carrying out CID via resonance excitation, described in U.S. Pat. No. 6,410,913, addresses the chemical compound dependence of CID energy required for a particular experiment by ramping the amplitude of a supplemental broadband waveform that consists of a mixture of multiple discrete frequencies. This method does not require optimization of the applied waveform amplitude for different chemical compounds. However, the broadband waveform may break or eject product (daughter) ions whose masses are close to the precursor (parent) ions, resulting in loss of information. In addition, the CID time is restricted to being the integer times of the repeat cycle of the waveform.

Another method is referred to as Red-Shifted Off-Resonance Large-Amplitude Excitation (RSORLAE) in Qin & Chait, "Matrix-Assisted Laser Desorption Ion Trap Mass Spectrometry: Efficient Isolation and Effective Fragmentation of Peptide Ions," *Anal. Chem.* 1996, vol. 68, p. 2108-2112. After isolating a precursor ion, a "jump scan" is performed in which the amplitude of the applied RF trapping field is raised from a low level to a higher level over a period of 10 ms. The amplitude of the RF trapping field is then dropped abruptly to a lower level in preparation for excitation of the precursor ion. During the excitation period, the precursor ion is not excited resonantly. Instead, an AC excitation field is applied at a large amplitude (21 $V_{p-p}$) and at a frequency red-shifted about 5%, i.e., shifted to the red of the resonant frequency. This method, however, while yielding promising results for peptide ions, is not suitable for a wide range of differing compounds and chemical structures.

U.S. Pat. No. 5,451,782 describes a method for ejecting ions from an ion trap by employing a supplemental AC field having an off-resonance frequency instead of a resonance frequency. The off-resonance frequency is stated as nearly matching the resonance frequency. The amplitude of the supplemental AC field is set to a sufficiently large value to cause ions to be ejected from the ion trap without undergoing resonance excitation. This patent, however, does not teach or enable how an off-resonance waveform could be employed to successfully effect CID. Furthermore, this patent does not teach or appreciate the use of a multipole field in combination with a quadrupole field and an off-resonance waveform for any purpose or advantage.

Therefore, there is a need for providing improved methods and apparatus for exciting ions in an ion trap, particularly for effecting CID. There is also a need for providing a CID technique that may be implemented in a consistent and repeatable manner for a wide variety of ions regardless of chemical structure.

SUMMARY OF THE INVENTION

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one implementation, a method is provided for exciting a precursor ion in an ion trap. The precursor ion is trapped in a nonlinear trapping field that includes a quadrupolar field and a multipole field. The quadrupolar field is generated by applying a radio-frequency (RF) trapping voltage to an electrode structure of the ion trap at an RF trapping amplitude and RF trapping frequency. A supplemental alternating-current (AC) voltage is applied to the electrode structure at a supplemental AC amplitude and supplemental AC frequency. The supplemental AC frequency differs from the secular frequency of the precursor ion by an offset amount. At least one of a plurality of operating parameters of the ion trap is adjusted, such that the precursor ion absorbs energy from the supplemental AC voltage sufficient to undergo collision-induced dissociation (CID) without being in resonance with the supplemental AC voltage. The operating parameters may include the RF trapping amplitude, the RF trapping frequency, the supplemental AC amplitude and the supplemental AC frequency.

According to another implementation, an ion trap for performing collision-induced dissociation (CID) on a precursor ion is provided. The ion trap includes a plurality of electrodes defining an interior space. The ion trap further includes first circuitry configured to apply a radio-frequency (RF) trapping voltage to the electrode structure at an RF trapping amplitude and RF trapping frequency to generate a quadrupolar trapping field, a device for superposing a multipole field on the quadrupolar trapping field to generate a nonlinear trapping field, second circuitry configured to apply a supplemental alternating-current (AC) voltage to the electrode structure at a supplemental AC amplitude and supplemental AC frequency, and third circuitry configured to adjust at least one of a plurality of operating parameters of the ion trap. The supplemental AC frequency differs from the secular frequency of the precursor ion by an offset amount. Upon adjustment of at least one of the operating parameters, the ion absorbs energy from the supplemental AC voltage sufficient to undergo CID without being in resonance with the supplemental AC voltage. The operating parameters may include the RF trapping amplitude, the RF trapping frequency, the supplemental AC amplitude and the supplemental AC frequency.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION OF THE INVENTION

The subject matter provided in the present disclosure generally relates to electrodes and arrangements of electrodes of the type provided in apparatus employed for manipulating, processing, or controlling ions. The electrode arrangements may be utilized to implement a variety of functions. As non-limiting examples, the electrode arrangements may be utilized as chambers for ionizing neutral molecules; lenses or ion guides for focusing, gating and/or transporting ions; devices for cooling or thermalizing ions; devices for trapping, storing and/or ejecting ions; devices for isolating desired ions from undesired ions; mass analyzers or sorters; mass filters; stages for performing tandem or multiple mass spectrometry (MS/MS or $MS^n$); collision cells for fragmenting or dissociating precursor ions; stages for processing ions on either a continuous-beam, sequential-analyzer, pulsed or time-sequenced basis; ion cyclotron cells; and devices for separating ions of different polarities. However, the various applications of the electrodes and electrode arrangements described in the present disclosure are not limited to these types of procedures, apparatus, and systems. Examples of electrodes and electrode arrangements and related implementations in apparatus and methods are described in more detail below with reference to FIGS. 1-5.

Figure 1:
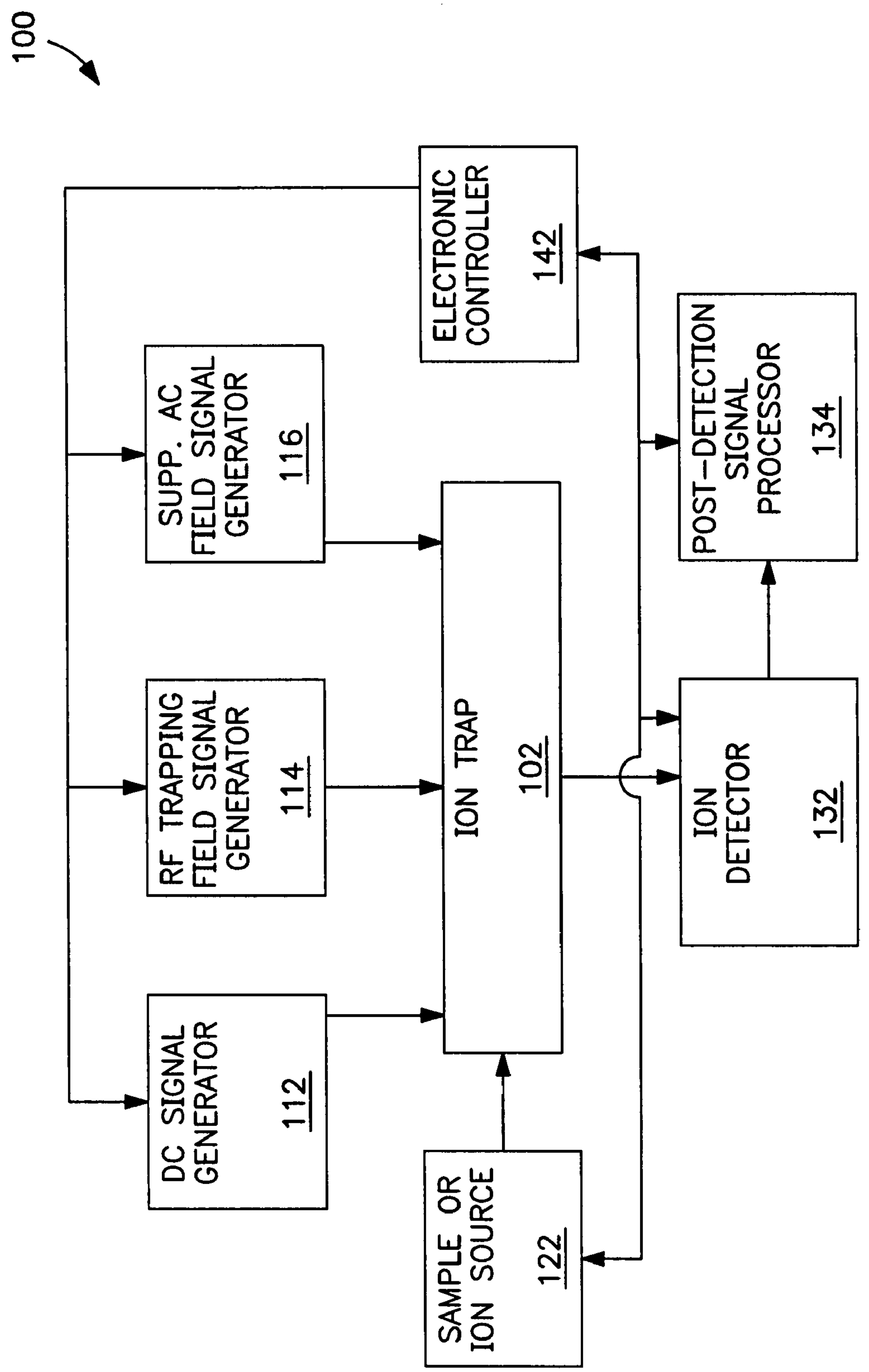
FIG. 1 is a schematic diagram of an example of a mass spectrometry system, as an example of an operating environment in which the invention may be implemented.

FIG. 1 is a highly generalized and simplified schematic diagram of an example of an ion trap-based mass spectrometry (MS) system 100. The MS system 100 illustrated in FIG. 1 is but one example of an operating environment in which implementations described in the present disclosure are applicable. Apart from their utilization in implementations described in the present disclosure, the various components or functions depicted in FIG. 1 are generally known and thus require only brief summarization.

The MS system 100 includes an ion processing device such as an ion trap 102 that may include a multi-electrode structure configured in either a three-dimensional (3-D) or two-dimensional (2-D, or "linear") arrangement, as generally described above and further described below with reference to FIGS. 2 and 3. A variety of DC and AC voltage sources may operatively communicate with the various conductive components of the ion trap 102 as described elsewhere in the present disclosure. These voltage sources may include a DC signal generator 112, an RF trapping field signal generator 114, and a supplemental AC field signal generator 116. The supplemental AC field generator 116 may be utilized, for example, to apply an off-resonance supplemental waveform signal as described below. More than one type of voltage source or signal generator may be provided as needed to operate the ion trap 102 in a desired manner. For instance, the supplemental AC field generator 116 may represent a fixed-frequency generator that applies a single-frequency supplemental AC signal to the ion trap 102 and, in addition, a separate multi-frequency generator that applies a supplemental AC signal having a broadband waveform or collection of frequencies to the ion trap 102. Arbitrary waveform generators may also be employed for various purposes such as applying isolation waveforms, CID waveforms, and/or ejection waveforms. One or more supplemental AC field generators 116 may be provided as needed to perform various functions such as ion isolation, CID, analytical scanning, and the creation of multipoles. It will be understood that, more generally, one or more signal "sources" or "generators" may include hardware, firmware, analog and/or digital circuitry, and/or software as needed for performing their functions. Moreover, one or more signal "sources" or "generators" may be replaced with appropriate memory and other circuitry and components for providing pre-calculated signals that may be stored in a library. It will be further understood that the DC signal generator 112 is often not needed, particularly when the ion trap 102 is configured to operate along the q-axis (a=0) of the ion trap 102.

A sample or ion source 122 may be interfaced with the ion trap 102 to provide ions in the ion trap 102 by either internal or external ionization. For example, in the case of internal ionization, the sample or ion source 122 may represent one or more devices for introducing sample material to be ionized into the ion trap 102 and implementing a suitable ionization technique (e.g., EI, CI, API, etc.) for ionizing the sample material in the ion trap 102. Alternatively, in the case of external ionization, the sample or ion source 122 may represent one or more devices for ionizing sample material and introducing the resulting ions into the ion trap 102. One or more gas sources (not shown) may communicate with the ion trap 102 for introducing inert background or active reagent gases as needed. The ion trap 102 may communicate with one or more ion detectors 132 for detecting ejected ions for mass analysis. The ion detector 132 may communicate with a post-detection signal processor 134 for receiving output signals from the ion detector 132. The post-detection signal processor 134 may represent a variety of circuitry and components for carrying out signal-processing functions such as amplification, summation, storage, and the like as needed for acquiring output data and generating mass spectra.

As illustrated by signal lines in FIG. 1, the various components and functional entities of the MS system 100 may communicate with and be controlled by any suitable electronic controller 142. The electronic controller 142 may represent one or more computing or electronic-processing devices, and may include hardware, firmware, analog and/or digital circuitry, and/or software attributes as needed for performing its functions. As examples, the electronic controller 142 may control the operating parameters and timing of the signals supplied to the ion trap 102 by the DC signal generator 112, the RF trapping field signal generator 114, and the supplemental AC signal generator(s) 116. In addition, the electronic controller 142 may execute or control, in whole or in part, one or more steps of the methods described in the present disclosure.

Figure 2:
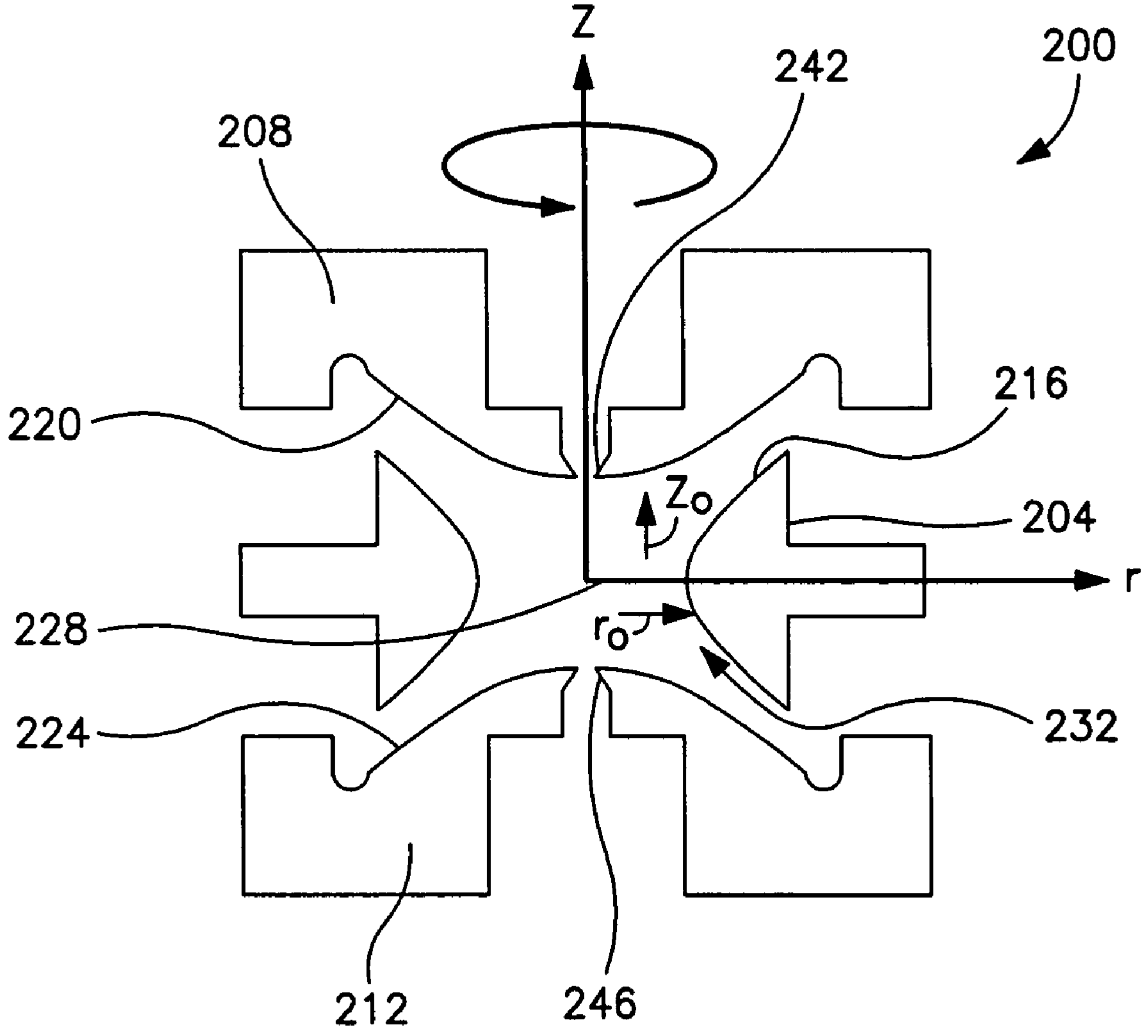
FIG. 2 is a cross-sectional view of an example of an electrode structure of three-dimensional (3-D) geometry that may be provided in an ion trap in which the invention may be implemented.

FIG. 2 illustrates an example of an electrode structure (or set, arrangement, system, device or assembly) 200 of 3-D geometry that may be utilized to manipulate or process ions, such as in the ion trap 102 illustrated in FIG. 1. For reference purposes, FIG. 2 illustrates a cross-section of the electrode structure 200 in the r-z plane. For descriptive purposes in the case of 3-D geometry, directions or orientations along the z-axis will be referred to as being axial, and directions or orientations along the orthogonal r-axis will be referred to as being radial or transverse.

The 3-D electrode structure 200 includes a plurality of electrodes, namely, an annular ring electrode 204 and two end cap electrodes 208 and 212. The example illustrated in FIG. 2 is typical of quadrupolar electrode arrangements for 3-D ion traps as well as other quadrupolar ion processing devices, except as may be modified to create multipoles as described below. The electrodes 204, 208 and 212 are shown in cross-section with the understanding that their geometries are swept about the z-axis. Each electrode 204, 208 and 212 may be electrically interconnected with one or more of the other electrodes 204, 208, and 212 as required for generating desired electrical fields within the electrode structure 200. The electrodes 204, 208 and 212 include respective inside surfaces 216, 220 and 224 generally facing toward a mechanical or geometric center 228 of the electrode structure 200. The electrode structure 200 has an interior space or chamber 232 generally defined between the electrodes 204, 208 and 212. The respective inside surfaces 216, 220 and 224 of the electrodes 204, 208 and 212 generally face toward the interior space 232 and thus in practice are exposed to ions residing in the interior space 232.

Each electrode 204, 208 and 212 is positioned at some specified distance in the r-z plane from the center 228 of the electrode structure 200. Specifically, the ring electrode 208 is located at a radial distance $r_0$ from the center 228 and the end cap electrodes 208 and 212 are each located at an axial distance $z_0$ from the center 228. In a commonly employed trap geometry, $r_0=(2^{1/2})\,z_0$, or $r_0^2=2z_0^2$. In other implementations, the axial positions $z_0$ of the end cap electrodes 208 and 212 may intentionally differ from each other (e.g., one electrode 208 or 212 is located farther away from the center than the other electrode 212 or 208), and/or deviate from the condition $r_0^2=2z_0^2$ (e.g., a "stretched" configuration), for such purposes as introducing certain types of electrical field effects or compensating for other, undesired field effects. For example, the arrangement of the electrodes 204, 208 and 212 may be stretched or otherwise modified to superpose higher-order multipole fields on the quadrupole trapping field generated by the electrodes 204, 208 and 212.

Each electrode 204, 208 and 212 has an outer surface and at least a section of the outer surface is curved. In the present example, the cross-sectional profile in the r-z plane of each electrode 204, 208 and 212—or at least the shape of the inside surfaces 216, 220 and 224—is curved. In some implementations, each cross-sectional profile in the r-z plane is generally hyperbolic to facilitate the utilization of quadrupolar ion trapping fields, as the hyperbolic profile more or less conforms to the contours of the equipotential lines that inform quadrupolar fields. The hyperbolic profile may fit a perfect hyperbola or may deviate somewhat from a perfect hyperbola. In other implementations, each cross-sectional profile of the electrodes 204, 208 and 212 may be some non-ideal hyperbolic shape such as an approximately hyperbolic shape or a circular shape. The terms "generally hyperbolic" and "curved" are intended to encompass all such implementations. In some implementations, the deviation from the ideal hyperbola is intentionally done to modify field effects in a desired manner, such as to superpose higher-order multipole fields on the quadrupole trapping field as noted above.

To facilitate functions such as sample or ion injection, gas injection, axial ion ejection, or the like, one or more apertures may be formed in one or more of the electrodes 204, 208 and 212. In the specific example illustrated in FIG. 2, respective apertures 242 and 246 are formed in the end caps 208 and 212 to facilitate ejection in a direction along the z-axis in response to application of a suitable instability- or resonance-based ejection technique. For example, a supplemental AC dipolar field may be produced between the end caps 208 and 212 to eject ions in the direction of the apertures 242 and 246. In practice, a suitable ion detector (not shown) may be placed in alignment with at least one of the apertures 242 and 246 to measure the flux of ejected ions. To maintain a desired degree of symmetry in the electrical fields generated in the interior space 232, the provision of two opposing apertures 242 and 246 may be desired instead of just one aperture, even if only one ion detector is provided. Likewise, apertures may be formed in all of the electrodes 204, 208 and 212. In some implementations, ions may be preferentially ejected in a single direction through a single aperture by providing an appropriate superposition of voltage signals and other operating conditions, as described for example in U.S. Pat. Nos. 5,291,017; 5,714,755; and 7,034,293, each of which is commonly assigned to the assignee of the present disclosure.

Figure 3:
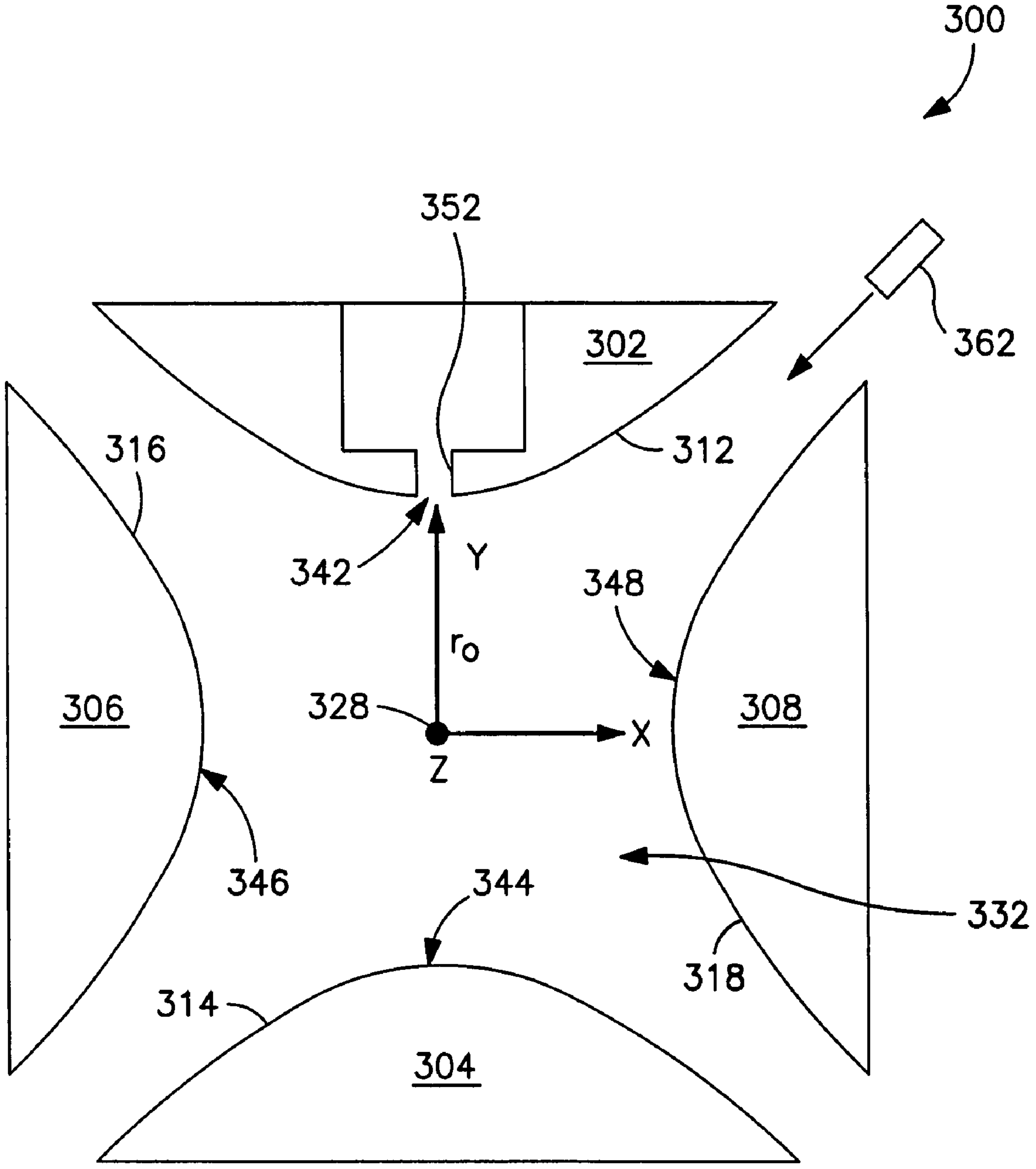
FIG. 3 is a cross-sectional view of an example of an electrode structure of two-dimensional (2-D) geometry that may be provided in an ion trap in which the invention may be implemented.

FIG. 3 illustrates an example of an electrode structure (or set, arrangement, system, device or assembly) 300 of 2-D geometry that may be utilized to manipulate or process ions, such as in the ion trap 102 illustrated in FIG. 1. FIG. 3 also includes a Cartesian (x, y, z) coordinate frame for reference purposes, such that FIG. 3 illustrates a cross-section of the electrode structure 300 in the x-y plane. For descriptive purposes in the case of 2-D geometry, directions or orientations along the z-axis will be referred to as being axial, and directions or orientations along the orthogonal x-axis and y-axis will be referred to as being radial or transverse.

The 2-D electrode structure 300 includes a plurality of electrodes 302, 304, 306 and 308. In the case of a 2-D arrangement, the electrodes 302, 304, 306 and 308 depict four separate electrodes that are elongated along the z-axis. That is, each of the electrodes 302, 304, 306 and 308 has a dominant or elongated dimension (for example, length) that extends in directions generally parallel with the z-axis. In other implementations, more than four electrodes 302, 304, 306 and 308 may be provided. The example illustrated in FIG. 3 is typical of quadrupolar electrode arrangements for 2-D ion traps as well as other quadrupolar ion processing devices, except as may be modified to create multipoles as described below. Each electrode 302, 304, 306 and 308 may be electrically interconnected with one or more of the other electrodes 302, 304, 306 and 308 as required for generating desired electrical fields within the electrode structure 300. The electrodes 302, 304, 306 and 308 include respective inside surfaces 312, 314, 316 and 318 generally facing toward the central z-axis of the electrode structure 300. The electrode structure 300 has an interior space or chamber 332 generally defined between the electrodes 302, 304, 306 and 308. In the case of the 2-D arrangement, the interior space 332 is elongated along the z-axis as a result of the elongation of the electrodes 302, 304, 306 and 308 along the same axis. The inside surfaces 312, 314, 316 and 318 of the electrodes 302, 304, 306 and 308 generally face toward the interior space 332 and thus in practice are exposed to ions residing in the interior space 332.

The electrodes 302, 304, 306 and 308 are coaxially positioned about a central longitudinal axis 328 of the electrode structure 300 or its interior space 332. In many implementations, the central axis 328 coincides with the geometric center of the electrode structure 300 and in the present example is taken to be the z-axis. Each electrode 302, 304, 306 and 308 is positioned at some radial distance $r_0$ in the x-y plane from the central axis 328. In some implementations, the respective radial positions of the electrodes 302, 304, 306 and 308 relative to the central axis 328 are equal. In other implementations, the radial positions of one or more of the electrodes 302, 304, 306 and 308 may intentionally differ from the radial positions of the other electrodes 302, 304, 306 and 308 for such purposes as introducing certain types of electrical field effects, such as to superpose higher-order multipole fields on the quadrupole trapping field as noted above, or compensating for other, undesired field effects.

The cross-sectional profile in the x-y plane of each electrode 302, 304, 306 and 308—or at least the shape of the inside surfaces 312, 314, 316 and 318—is curved, or generally hyperbolic, as in the 3-D case described above. As also noted above, deviations from a perfect hyperbola may be intentionally done to modify field effects in a desired manner, such as to superpose higher-order multipole fields on the quadrupole trapping field. In some implementations, the cross-sectional profiles of the electrodes 302, 304, 306 and 308 may be some non-ideal hyperbolic shape such as a circle, in which case the electrodes 302, 304, 306 and 308 may be characterized as being cylindrical rods. In still other implementations, the cross-sectional profiles of the electrodes 302, 304, 306 and 308 may be more rectilinear, in which case the electrodes 302, 304, 306 and 308 may be characterized as being curved plates. In all such implementations, each electrode 302, 304, 306 and 308 may be characterized as having a respective apex 342, 344, 346 and 348 that faces the interior space 332 of the electrode structure 300.

To facilitate functions such as sample or ion injection, gas injection, radial ion ejection, or the like, one or more apertures 352 may be formed in one or more of the electrodes 302, 304, 306 or 308 as in the 3-D case described above. The aperture 352 may be elongated along the z-axis, in which case the aperture 352 may be characterized as a slot or slit, to account for the elongated ion-occupied volume produced in the elongated interior space 332 of the electrode structure 300. In some implementations, ions may be preferentially ejected in a single direction through a single aperture by providing an appropriate superposition of voltage signals and other operating conditions, as mentioned above. Alternatively, ions may be axially ejected out from one of the ends of the 2-D electrode structure 300 by known techniques.

In another implementation, the 2-D electrode structure 300 has the 2-D or "linear" electrode arrangement as described above, but is curved. That is, the central axis 328 and electrodes 302, 304, 306 or 308 are curved. The cross-sectional view of FIG. 3 represents this implementation as well.

For convenience, the ensuing description will refer primarily to the 3-D electrode structure 200 illustrated in FIG. 2, with the understanding that the description likewise applies to the 2-D electrode structure 300 illustrated in FIG. 3 unless otherwise specified.

Generally, the electrode structure 200 is capable of receiving ions in the case of external ionization, or neutral molecules or atoms to be ionized in the case of internal or in-trap ionization, into the interior space 232 in any suitable manner and via any suitable entrance location. The introduction of ions into the interior space 232 by external ionization and the producing of ions in the interior space 232 by internal ionization will generally be referred to as "providing" ions in the interior space 232. "Providing" ions may also refer to the in-trap creation of product ions from precursor ions in a fragmentation or dissociation process.

In the operation of the electrode structure 200, a variety of voltage signals may be applied to one or more of the electrodes 204, 208 and 212 to generate a variety of axially- and/or radially-oriented electric fields in the interior space 232 for different purposes related to ion processing and manipulation. The electric fields may serve a variety of functions such as injecting ions into the interior space 232, trapping the ions in the interior space 232 and storing the ions for a period of time, ejecting the ions mass-selectively from the interior space 232 to produce mass spectral information, isolating selected ions in the interior space 232 by ejecting unwanted ions from the interior space 232, promoting the dissociation of ions in the interior space 232 as part of tandem mass spectrometry, and the like.

RF voltage signals of appropriate amplitude and frequency may be applied to the electrodes 204, 208 and 212 to generate a main RF quadrupolar trapping field to constrain the motions of stable (trappable) ions of a range of mass-to-charge ratios (m/z ratios, or simply "masses") along directions radial to the central axis or mechanical center. The trapping field potential $\phi_0$ may be expressed in a general form as $\phi_0=U-V\cos(\Omega t)$, where U is an optional direct-current (DC) voltage, V is the amplitude of the periodic voltage, and Ω is the frequency in rad/s of the periodic voltage. The angular frequency Ω may be converted to frequency f in Hz according to the relation $\Omega=2\pi f$. For example, in the case of 3-D geometry (FIG. 2), a 3-D (r-z) RF quadrupolar trapping field may be generated by applying an RF trapping field potential $\phi_0$ to the ring electrode 204. While applying the potential $\Omega_0$ to the ring electrode 204, a potential-$\Omega_0$ may be applied to the end caps 208 and 212 or the end caps 208 and 212 may be grounded. Alternatively, the RF component $V\cos(\Omega t)$ is applied to the ring electrode 204 while a DC component −U is applied to both end caps 208 and 212. In the case of 2-D geometry (FIG. 3), a 2-D (x-y) RF quadrupolar trapping field may be generated by applying an RF signal of the same general form $V(t)=\pm(U-V\cos(\Omega t))$ to the pair of opposing y-electrodes 302 and 304 and, simultaneously, applying an RF signal of the same amplitude and frequency as the first RF signal, but 180° out of phase with the first RF signal, to the pair of opposing x-electrodes 306 and 308. In the 2-D case, the combination of the 2-D RF quadrupolar trapping field and a DC axial (z) barrier field forms the basic linear ion trap in the electrode structure 300.

The motion of ions in the RF quadrupole trapping field may be described by the Mathieu equation, which is a well-known second-order linear differential equation. The solutions a and q to the Mathieu equation are known as the operating or working points of an ion in an ion trap. Generalized for both the 3-D and 2-D geometries and for any direction u (x, y or z; or r or z), the solutions a and q may be expressed as follows:

$$a_u = \frac{K_a e U}{m r_0 \Omega^2}, \text{ and}$$

$$q_u = \frac{K_q e V}{m r_0 \Omega^2},$$

where U is the magnitude of the applied direct current (DC) voltage (if any), V is the amplitude of the applied RF voltage, Ω is the angular frequency of the RF voltage, e (or z) is the charge on the ion, m is the mass of the ion, and $r_0$, $K_a$ and $K_q$ are device-dependent constants. In implementations in which no DC voltage is applied, $a_u=0$. Specific forms of the equations for a and q depend on such factors as the direction of interest (x, y, z, r), the geometry of the ion trap (3-D or 2-D), the spacing between opposing electrode surfaces, the electrodes to which the trapping voltage is applied, etc. The specific forms are known to persons skilled in the art and thus will not be repeated in this disclosure. Of general interest in the present disclosure is the fact that the value of $q_u$ for an ion is a function of the m/z (or m/e) ratio of the ion, the amplitude V of the applied RF trapping field, and the frequency Ω of the applied RF trapping field. The operating point (a, q) of an ion can be located on a stability diagram (with a horizontal q-axis and vertical a-axis) for the given ion trap to determine whether the ion is within a stability region and its motion is therefore stable (i.e., its trajectories do not reach the electrodes).

Because the components of force imparted by the RF quadrupolar trapping field are typically at a minimum at the geometric center 228 of the interior space 232 of the electrode structure 200 (assuming the electrical quadrupole is symmetrically centered at the geometric center 228), all ions having m/z ratios that are stable within the operating parameters of the quadrupole are constrained to movements within an ion-occupied volume or cloud in which the locations of the ions are distributed generally around the center 228 (or along the central axis 328 in the 2-D case). Hence, this ion-occupied volume may be much smaller than the total volume of the interior space 232, and in the case of 2-D geometry may be elongated along the central axis 328. In many implementations, the well-known process of ion cooling or thermalizing may further reduce the size of the ion-occupied volume for such purposes as reducing the effects of unwanted field faults, improving mass resolution and sensitivity, etc. The ion cooling process entails introducing a suitable inert background gas (also termed a damping, cooling, or buffer gas) into the interior space 202. Collisions between the ions and the gas molecules cause the ions to give up kinetic energy, thus damping their excursions. Examples of suitable background gases include, but are not limited to, hydrogen, helium, nitrogen, xenon, and argon. Any suitable gas source, communicating with any suitable opening of the electrode structure 200 or enclosure of the electrode structure 200, may be provided for this purpose. For example, a gas source 362 may be positioned as shown in FIG. 3.

In addition to DC (if any) and main RF trapping signals, additional AC voltage signals of appropriate amplitude and frequency (both typically less than the main RF trapping signal in conventional implementations) may be applied to the opposing end cap electrodes 208 and 212 (or an electrode pair 302/304 or 306/308 in the 2-D case) to generate a supplemental AC dipolar excitation field, the frequency of which may also fall within the RF spectrum. The supplemental AC field may be applied while the main RF trapping field is being applied, and the resulting superposition of fields may be characterized as a combined or composite field. Alternatively, a supplemental AC quadrupolar excitation field may be applied as appreciated by persons skilled in the art.

Conventionally, the supplemental AC field has been utilized to resonantly excite trapped ions of selected m/z ratios. Typically, the frequency of the supplemental AC voltage is set to less than one half of the frequency of the RF trapping voltage (which is typically 1.05 MHz or thereabouts). Each trapped ion has a secular frequency of oscillation that depends on its mass (m/z ratio), the physical characteristics of the electrode structure 200 or 300 (which are typically fixed), and the amplitude and frequency of the RF trapping voltage (which values can be varied by the electronics). The fundamental secular frequency $\omega_{sec}$ of an ion is a function of the frequency $\Omega$ of the RF trapping voltage according to the well-known relation $\omega_{sec}=\frac{1}{2}\beta_u\Omega$, where $\beta_u$ in turn is a function of the Mathieu operating parameters a and q for the direction of interest u (x, y, z, or r). Various equations and approximations for $\beta$ exist in the literature, the following being reasonably accurate when a<<q and q<0.4:

$$\beta \approx \left(a + \frac{q^2}{2}\right)^{1/2}.$$

If the secular frequency of the ion matches the frequency of the supplemental AC voltage, the ion efficiently absorbs energy from the supplemental AC field and, consequently, the amplitude of the ion's oscillation increases in the component direction associated with that secular frequency. Accordingly, resonance excitation of trapped ions may be employed to promote or facilitate collision-induced dissociation (CID) or other ion-molecule interactions or reactions with a reagent gas. In addition, the strength (amplitude) of the excitation field component determines the rate of increase of ion oscillation, and may be adjusted high enough to enable ions of selected masses to overcome the restoring force imparted by the RF trapping field and be ejected from the electrode structure 200 for elimination, ion isolation, or mass-selective scanning and detection. Thus, in some implementations, ions may be ejected from the interior space 232 along a direction orthogonal to the center 228, e.g., in the direction of the z-axis along which the end cap electrodes 208 and 212 are situated. As described above, ejected ions may pass through one or more apertures 242 and 246 and reach an appropriately positioned ion detector to measure the flux of ejected ions. Similarly, in the case of the 2-D electrode structure 300, ions may be ejected in the direction of the opposing pair of y-electrodes 302/304 or x-electrodes 306/308 to which the supplemental AC dipole is applied.

As appreciated by persons skilled in the art, because the secular frequency of an ion depends on its m/z ratio and may be varied by varying (scanning or ramping) the amplitude or frequency of the RF trapping voltage, the RF trapping voltage may be controlled to resonantly excite ions of different m/z ratios in mass-succession, i.e., in a mass-selective manner. For instance, increasing the amplitude of the RF trapping voltage increases the secular frequency of an ion of a given m/z ratio. As the RF trapping voltage is ramped, ions of differing m/z ratios are successively brought into resonance with the applied supplemental AC excitation field. Thus, ion ejection by resonant excitation may be performed on a mass-selective basis by, for example, maintaining the supplemental AC excitation field at a fixed frequency while ramping the amplitude of the RF trapping voltage. Alternatively, the frequency of the RF trapping voltage or the frequency of the AC excitation voltage may be ramped to achieve mass-wise resonant excitation.

In addition, certain experiments, including CID processes, may require that desired ions of a selected m/z ratio or ratios be retained in the electrode structure 200 for further study or procedures and that the remaining undesired ions having other m/z ratios be removed from the electrode structure 200. Any suitable technique may be implemented by which the desired ions are isolated from the undesired ions. In particular, ejection by resonant excitation is also useful for performing ion isolation. For example, a supplemental AC excitation signal may be applied to a pair of opposing electrodes 208 and 212 to eject undesired ions of selected m/z values from the trapping field by resonant excitation along the axis of the electrodes 208 and 212. Examples of techniques employed for ion isolation include, but are not limited to, the use of a single-frequency signal (in combination with a scanned RF trapping signal), a tailored excitation waveform, a notch-filtered noise waveform, a broadband waveform, a collection of discrete frequencies, multi-frequency irradiation (MFI), and others known to persons skilled in the art. Other examples are described in U.S. Pat. Nos. 5,198,665; 5,300,772; 5,521,380; 5,793,038; and 6,710,336, each commonly assigned to the assignee of the present disclosure.

In contrast to the conventional resonant excitation techniques and particularly CID techniques such as described above, the present invention effects CID by exciting precursor (or parent) ions with an off-resonance CID supplemental AC waveform signal, as described below. Moreover, the off-resonance waveform is applied to a nonlinear trapping field established by deliberately superposing one or more higher-order multipole fields on the quadrupolar field. For an ion stably trapped in a quadrupolar trapping field in the presence of a damping gas, and before applying a supplemental AC field, the kinetic energy of oscillating ion varies between zero and a maximum value that decreases over time such that the average kinetic energy of the ion likewise decreases over time. When the supplemental AC field is added, the amplitude of the ion's oscillation (along the axis of the applied supplemental AC field) and thus the ion's kinetic energy increases over time. Application of the supplemental AC field results in fragmentation or ejection if the amplitude of the AC signal is high enough such that energy from the AC signal is added to the ion at a greater rate than the reduction in the ion's translational and internal energies due to the thermalizing collisions with the damping gas. As will become evident below, the application of the off-resonance CID supplemental AC field in a nonlinear trapping field modifies the behavior of the ion in a manner that not only allows the ion to be excited for longer periods of time and thereby promote fragmentation of the ion over ejection or loss, but also enables fragmentation in a non-resonant regime that is largely independent of chemical structure.

In a pure (or ideal, or "linear") trapping field, only the quadrupole is present, i.e., no significant other multipole moments are present, and the restoring force is a linear function of the displacement of the ions from the center of the quadrupolar field. That is, the RF field strength increases linearly with distance away from the center. In addition, the secular frequency of an ion in a pure trapping field is independent of the position of the ion relative to the center. Here it will be noted that the term "linear" used to describe a pure trapping field should not be confused with the term "linear" used to describe a 2-D ion trap structure. Implementations of the present invention include the application of a nonlinear trapping field to "linear" ion traps, i.e., ion traps having the 2-D geometry.

In contrast to a pure quadrupolar trapping field, in the nonlinear trapping field employed in the invention, one or more higher-order multipole fields are added to the quadrupolar field. In the nonlinear trapping field, the relationship between restoring force and ion position is not linear, and the secular frequency of the ion is a function of its position even if all trapping parameters are held constant. Generally, no limitations are placed on the type of multipole field or fields superposed on the quadrupolar field in accordance with the invention. The multipole field may be an odd-ordered field (having an odd number of pole pairs) such as a hexapole or decapole field, which produces asymmetric distortions in the quadrupolar field. The multipole field may alternatively be an even-ordered field (having an even number of pole pairs) such as an octopole or dodecapole field, which produces symmetric distortions in the quadrupolar field.

The particular relationship between the secular frequency of the ion and its position depends on the type of multipole field(s) present, including the signs and magnitudes (strengths) of the multipole(s). For example, if a hexapole or octopole field of the same sign as a quadrupole trapping field is added to the quadrupole trapping field, the secular frequency of an ion increases as the amplitude of the oscillation of the ion increases. Other types or orientations of multipole fields may be selected such that the secular frequency decreases with increasing amplitude of ion motion.

The multipole field or fields generated by implementations of the invention may be superposed on the quadrupolar field by any suitable mechanical or electrical means. Some examples of techniques for mechanically creating multipole fields include various physical (geometrical, spatial, etc.) modifications to the ideal electrode structure of the ion trap, such as those described above. The shape or size of an electrode and/or its position relative to the other electrodes may be modified. For instance, one or more electrodes may be shaped in a manner deviating from the ideal hyperbolic profile to add a hexapole and/or octopole to the quadrupole field. For example, the shape of an electrode may be more "blunt" or "sharp" in comparison to the ideal hyperbola or hyperboloid. In addition, the modification to the shape of the electrode may render the cross-section of the electrode asymmetric relative to a coordinate axis of the ion trap. For example, the cross-sectional shape of the upper end cap electrode 208 in FIG. 2 is rotationally symmetrical about the z-axis, i.e., the half portion of the electrode 208 on the left side of the z-axis appears to be the mirror image of the other half portion on the right side of the z-axis. Similarly, the cross-sectional shape of the upper y-electrode 302 in FIG. 3 is symmetrical about the y-axis. This symmetry may be retained even after making the desired "blunt" or "sharp" alterations. On the other hand, multipole distortions may also be produced with electrodes such as electrodes 208 and 302 that are asymmetrically shaped relative to their respective axes such that one cross-sectional half is shaped differently than the other cross-sectional half.

Alternatively, deviations in the shape of an electrode may be localized or otherwise distinctive in relation to the remaining portion of the electrode. For example, bumps or bulges may, for example, protrude out from the surfaces of one or more electrodes. Such bumps or bulges may be provided on the apical regions of one or more electrodes, and proximate to an aperture of an electrode. In another example of mechanically creating multipoles, the positions of an opposing pair of electrodes or end cap electrodes may be stretched from their ideal separation as described above to add an octopole component to the quadrupole field. The "stretching" of the distance of the electrodes from the 3-D center or 2-D central axis may be symmetrical or asymmetrical. That is, each opposing electrode may be stretched from the ideal separation by an equal amount, or one electrode of the opposing pair may be moved farther way from the center or central axis than the other electrode to produce an asymmetrical distortion. As another example, one opposing pair of electrodes may be made larger in size than the other electrode(s) to add an octopole component to the quadrupole field. As another example, one opposing pair of electrodes may be rotated (relative to the geometric center of the trap structure) or displaced toward another electrode to add a hexapole component to the quadrupole field.

As an example of utilizing electrical means to superpose multipole fields, an auxiliary dipole potential may be applied to an opposing pair of electrodes at the same frequency and phase as the RF trapping potential. This auxiliary dipole potential adds a hexapole component of desired strength (e.g., 30% of the auxiliary dipole potential) to the quadrupole field, and is described in detail in above-cited U.S. Pat. No. 7,034,293, the entire contents of which are incorporated into this disclosure. An odd-order multipole field may also be created by making the amplitude of the RF voltage of one electrode different than the amplitude at the opposing electrode.

Combinations of two or more of the foregoing mechanical and electrical techniques may be implemented. In each case, a significant hexapole and/or octopole may be added. One or more multipole components of higher order than hexapoles and octopoles, and of various strengths, may also be added as a result.

It will be noted that the nonlinear trapping fields employed in the invention are the result of deliberately imposed multipole components. The field strengths of these multipole components, particularly the hexapole and octopole components, may for example be about 1% or greater of the strength of the applied quadrupolar RF trapping field. In other examples, the field strengths of these multipole components may range from about 1% to about 10% of the strength of the applied quadrupolar RF trapping field. In other examples, the field strength of a multipole may be greater than 10% of the strength of the applied quadrupolar RF trapping field, so long as the multipole does not interfere with the intended operation of the RF trapping field. Thus, the deliberately imposed multipole components utilized in the invention are to be distinguished from the typically weaker, unintentional field faults and distortions resulting from machining and assembly imperfections, from the use of apertures in the electrodes, from the necessarily finite size of the electrodes (i.e., real electrodes are truncated; their surfaces do not infinitely extend toward the asymptotic lines of the perfect hyperbolic geometry that would result in a purely quadrupolar electric field), space-charge effects, and the like.

In implementations of the invention, at the beginning of CID, one or more precursor ions are stored in an RF trapping voltage under which the secular frequency of the precursor ion is different from the frequency of the applied off-resonance AC waveform by an offset amount. Stated in another way, the frequency of the supplemental AC excitation field utilized for CID is set to be intentionally different from the secular frequency or frequencies of the precursor ions. For example, the frequency of the supplemental AC excitation field may be offset from the secular frequency by about 2 kHz. In another example, an offset of about 3 kHz has also been found to work well for CID. In another example, the frequency of the supplemental AC excitation field may be offset from the secular frequency by a value ranging from greater than 0 kHz (e.g., about 0.5 kHz) to about 5 kHz. The amplitude of the RF trapping voltage versus the operating q (or β) value for the precursor ion may be calibrated by known means, and thus the secular frequency of the parent ion may be estimated with an accuracy of about a few hundred Hz. The amplitude of the supplemental AC excitation voltage is set to be large enough to effect CID on the ions of interest at the off-resonance supplemental AC excitation frequency. As an example, the amplitude of the AC excitation voltage may range from about 0.01% to about 1% of the RF trapping voltage; in another example, the range is from about 0.02% to about 0.5%. In other implementations, the AC excitation amplitude may fall outside the foregoing ranges. More generally, the setting of the AC excitation amplitude may be based on such factors as the trap structure, the q value and duration of the CID period, the RF trapping frequency, etc. The AC excitation amplitude may be determined empirically, as described below. During CID, the AC excitation amplitude may be fixed (held constant) while the RF trapping voltage is ramped (see below) or may also be ramped.

Subsequently, either the amplitude (or frequency) of the RF trapping voltage is ramped up or down or the off-resonance AC frequency is swept up or down, resulting in fragmentation of the precursor ion or ions. As further explained below, the invention ensures that ions of different chemical structures receive the correct energies for optimal fragmentation without needing to optimize the amplitude of the AC excitation field for individual ions. Thus, the invention is able to optimally fragment ions without prior knowledge of the chemical structure of the precursor ion or the amplitude of the AC excitation field required to fragment that particular precursor ion.

In one implementation, at the beginning of CID, a precursor ion (or ions) is stored in an RF trapping voltage under which the secular frequency of the precursor ion is higher than the frequency of the applied off-resonance AC waveform. That is, the frequency of the off-resonance AC excitation voltage is set to be lower than the secular frequency by an offset value of, for example, about 2 kHz. While applying the off-resonance AC waveform, the amplitude of RF trapping voltage is ramped down. As the RF trapping voltage is ramped down, the difference between the secular frequency of the precursor ion and the frequency of the off-resonance AC waveform is gradually reduced. This allows the precursor ion to gradually absorb more energy from the off-resonance AC field. The excitement of the precursor ion by this off-resonance CID excitation field increases the amplitude of the oscillation of the precursor ion. The precursor ion will fragment to form product ions when the absorbed energy reaches the threshold for fragmentation. For more stable parent ions, more energy is needed for fragmentation. Therefore, more stable parent ions will fragment later than less stable (or unstable) ions.

However, as noted above, the trapping field utilized in the invention is a composite of the quadrupolar field and at least one higher-order multipole field, such that the increase in the amplitude of the ion oscillation affects the secular frequency of the ion. Thus, in an example in which a hexapole or octopole field of appropriate sign is superposed on the quadrupole field, the increase in the oscillation of the precursor ion due to taking up energy from the off-resonance CID field causes in increase in the secular frequency of that ion. In this case, while the scanning down of the RF trapping voltage causes a decrease in the ion secular frequency, the resulting increase in ion oscillation causes an increase in the ion secular frequency. The excited precursor ion collides with the molecules of a background collision gas present in the ion trap. For unstable ions, the collision energy is high enough to break down (fragment) the ions. For stable ions, collision results in a reduction in their oscillation amplitude and hence a reduction in their secular frequency. Due to the reduction in the amplitude of oscillation of these ions, as well as the decreasing level of the amplitude of the RF trapping voltage, the secular frequency of these ions again approaches the frequency of the applied off-resonance CID voltage and, consequently, these ions will again be excited by the off-resonance CID excitation field. When these ions collide with the background collision gas, they will be fragmented because they have gained more kinetic energy and internal energy this time.

The above-described process may be repeated multiple times until the end of the CID period. Unstable ions will fragment in the relatively early part of the CID period, and stable ions will fragment in the relatively late part of the CID period. Because this method ensures that different ions receive the correct energy for optimum fragmentation without having to change the amplitude of the supplemental CID excitation field, it eliminates the need to optimize CID collision energy (e.g., by having to adjust the amplitude of the supplemental AC field) for different parent ion structures.

It will be noted that during the CID process, the precursor ions are excited under a non-resonance condition. Relatively stable ions, i.e., those ions that do not fragment early in the CID period, are excited periodically or in an on/off manner as their secular frequencies shift toward and away from the off-resonance frequency of the supplemental CID excitation field due to the dependence of their secular frequencies on their position, which in turn is a result of the nonlinear trapping field. Moreover, the CID excitation technique of the invention does not cause the precursor ions to be ejected from the ion trap during the CID stage.

In another implementation, at the beginning of CID, precursor ions are stored in an RF trapping voltage under which the secular frequency of the precursor ions is lower than the frequency of the applied off-resonance AC waveform, such as by 2 kHz or some other appropriate offset amount. In this implementation, after storing the precursor ions and applying the off-resonance AC waveform, the amplitude of RF trapping voltage is ramped up instead of down. In this implementation, the higher-order multipole field superposed on the quadrupolar trapping field may be selected such that ion secular frequency decreases with increasing ion oscillation amplitude.

In another implementation, the RF trapping voltage is held constant during the CID period, and a frequency sweep waveform is applied. That is, the supplemental off-resonance AC frequency is varied (swept up or down) depending on the characteristics of the nonlinear trapping field.

The amplitude of the supplemental CID excitation voltage may be determined empirically under selected operating parameters, for example, when CID is performed for about 15 ms with the Mathieu q value at about 0.3. For example, it has been found that precursor ions will be fragmented with reasonable yields if the amplitude of the supplemental CID excitation voltage is in a region bounded by the following curves:

$$\text{Amplitude}_{Supp\ CID}=0.0070\times\text{Mass}_{parent\ ion}+0.0210,\text{ and}$$

$$\text{Amplitude}_{Supp\ CID}=0.0005\times\text{Mass}_{parent\ ion}+0.3619,$$

where the values for $\text{Amplitude}_{Supp\ CID}$ are given in Volts (V) and the values for $\text{Mass}_{parent\ ion}$ are given in Daltons (Da).

It will be noted, however, that the relation of $\text{Amplitude}_{Supp\ CID}$ to $\text{Mass}_{parent\ ion}$ is not required to be linear, as long as $\text{Amplitude}_{Supp\ CID}$ falls between the two curves. For a differently sized ion trap, or different trapping voltage parameters, or different CID voltage parameters, the amplitude of the supplemental CID excitation voltage ($Amplitude_{Supp\ CID}$) may need to be adjusted appropriately.

Figure 4:
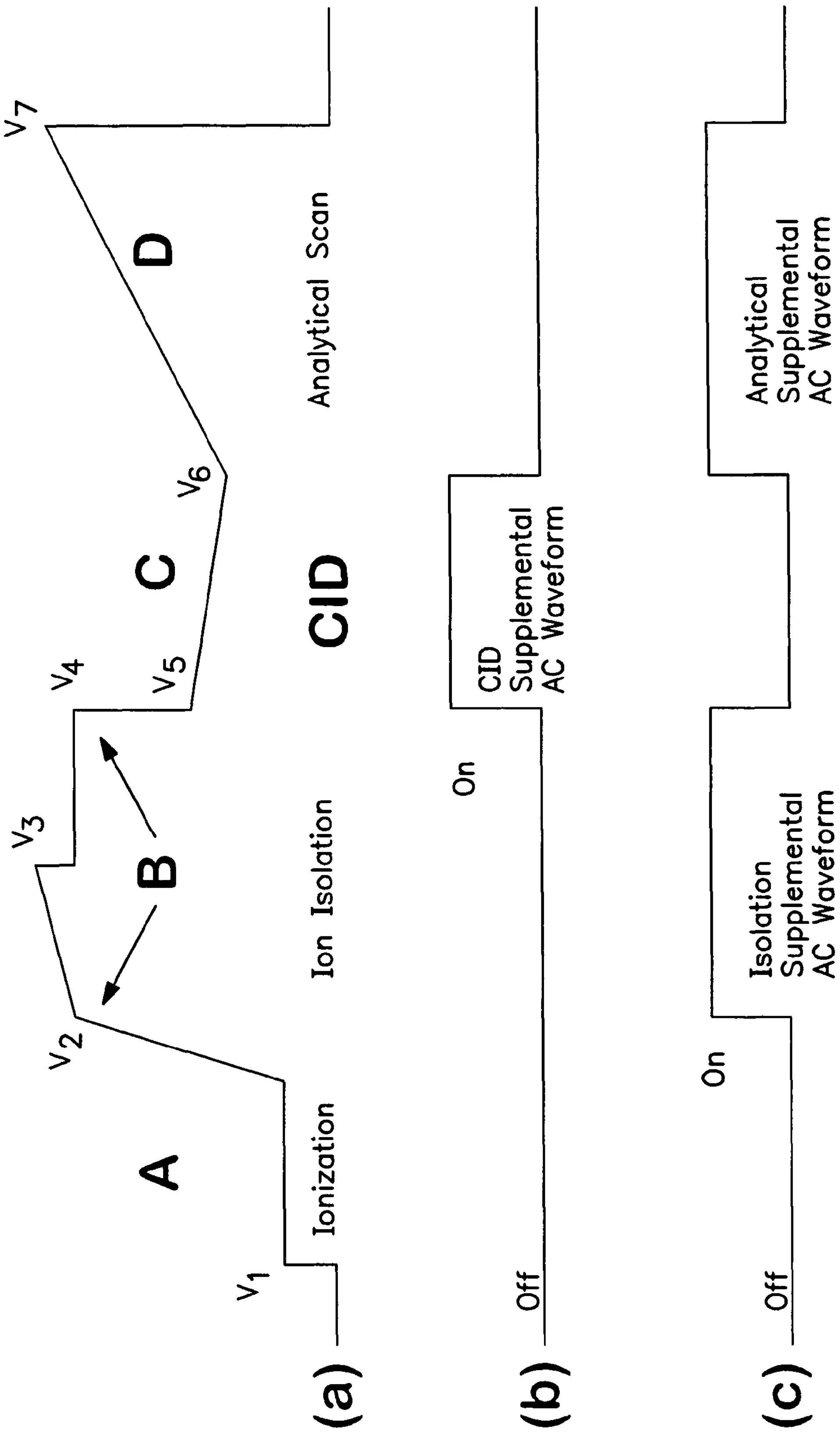
FIG. 4 is a signal diagram illustrating an example of a time sequence of signals that may be applied in accordance with implementations described in the present disclosure.

FIG. 4 is a schematic diagram of the timing sequences of various waveforms (voltage signals) utilized according to an example of an implementation of the invention. Specifically, FIG. 4(*a*) illustrates the amplitude as a function of time of the RF trapping voltage applied to the ion trap. FIG. 4(*b*) illustrates the timing of the application of the supplemental AC voltage utilized for CID excitation. FIG. 4(*c*) illustrates the timing of the application of the supplemental AC voltage utilized for isolating a precursor ion in the ion trap, e.g., a parent ion or, in additional iterations of CID, a daughter ion, granddaughter ion, etc. FIG. 4(*c*) also illustrates the timing of the application of the supplemental AC voltage utilized for performing an analytical scan of the product ion (daughter ion, granddaughter ion, etc.) resulting from the CID stage. As previously noted, one or more voltage sources (generators, synthesizers, etc.) may be employed to apply the various supplemental AC voltages, particularly in view of the fact that they are applied at different times. Although not shown in FIG. 4, an additional supplemental AC voltage may be applied to superpose a multipole field by electrical means, as described above. The operation depicted in FIG. 4 spans four primary stages or processes: ionization (and storage) A, ion isolation B, CID C, and analytical scan D.

The presence of the ionization stage in FIG. 4 assumes that the ion trap is configured or operated for internal ionization. During the ionization stage, the sample material to be analyzed is introduced into the ion trap and is ionized by a suitable ionization apparatus such as described above. During ionization, the amplitude of the RF trapping voltage, corresponding to section A in FIG. 4, is set to value $V_1$ suitable for trapping all sample ions having masses (m/z ratios) within a desired range, including the desired precursor (or parent) ion of mass m(p). Ions having masses outside the desired range are eliminated from the ion trap and thus are not stored. In the case of external ionization, a suitable ionization apparatus ionizes the sample material and introduces the resulting ions into the ion trap where they are stored by the RF trapping voltage in a similar manner. In the case of external ionization, the ionization stage shown in FIG. 4 may be thought of as an ion introduction and storage stage.

After the desired range of ions have been stored, the RF trapping field is ramped from $V_1$ to $V_2$, corresponding to section B in FIG. 4. Any suitable isolation technique may be employed, such as those referred to earlier in the disclosure. In one example, the RF trapping field may be held $V_2$ at while a suitable supplemental AC isolation waveform is turned on (FIG. 4(*c*)). The supplemental AC isolation waveform in this case may be composite or broadband waveform consisting of a mixture of different frequencies. Such a broadband waveform may have a notch or window centered at the frequency corresponding to the secular frequency of the precursor ion to be isolated so that the precursor ion is not excitedly induced to ejection by the supplemental AC isolation waveform. The frequency of the supplemental AC voltage may be set for ejecting the unwanted ions from the ion trap under resonance conditions, or alternatively the amplitude of the supplemental AC voltage may be set high enough to cause ejection under an off-resonance condition according to the teachings of the present disclosure. In another example, the supplemental AC isolation waveform may be activated even while the RF trapping field is being ramped from $V_1$ to $V_2$. In other examples, a frequency of the combined field is scanned while the amplitude of the RF trapping field is held constant.

In the example specifically illustrated in FIG. 4, a supplemental AC isolation waveform of fixed frequency is activated after the RF trapping field is ramped to $V_2$, and the RF trapping field is then ramped up to $V_3$. The ramping of the RF trapping field from $V_2$ to $V_3$ causes ejection of all ions having masses less than or equal to m(p)−1. The RF trapping field is then stepped down from $V_3$ to $V_4$, or alternatively ramped down from $V_3$ to $V_4$, depending on the composition of the supplemental AC voltage signal. During this time, the supplemental AC voltage is applied to eject of all ions having masses equal to or greater than m(p)+1. For this purpose, the portion of the supplemental AC voltage signal shown in FIG. 4(*c*) corresponding to the interval between $V_3$ to $V_4$ may be a broadband waveform or a waveform containing an ensemble of frequencies, including frequencies equal or close to the secular frequencies of the ions having masses equal to or greater than m(p)+1.

At the end of the isolation stage, the precursor ion of mass m(p) is isolated in the ion trap and the RF trapping field is lowered to $V_5$, the magnitude of which is sufficient for storing the precursor ion. The CID stage is then commenced to fragment the precursor ions into product ions according to the implementations described above. During the CID stage, the RF trapping field is ramped from $V_5$ to $V_6$, corresponding to section C in FIG. 4, while the supplemental CID excitation waveform is applied (FIG. 4(*b*)). By way of example, the frequency of the supplemental CID excitation waveform is set to a value lower than the secular frequency of the precursor by a suitable offset amount (as described above) and the RF trapping field is lowered from $V_5$ to $V_6$. Generally, the amplitude of $V_6$ is at a value sufficient for storing the product ions.

At the end of the CID stage, the product ions are analytically scanned from the ion trap by any suitable technique, and detected and processed to produce a mass spectrum of the product ions. In the illustrated example, during the analytical scan stage, the RF trapping field is ramped from $V_6$ to $V_7$, corresponding to section D in FIG. 4, while the supplemental AC analytical scan waveform is applied (FIG. 4(*c*)). The frequency of the supplemental AC voltage during this stage may be set for ejecting the product ions from the ion trap under resonance conditions, or alternatively the amplitude of the supplemental AC voltage may be set high enough to cause mass-selective ejection under an off-resonance condition according to the teachings of the present disclosure. In another example, a frequency of the combined field is scanned while the amplitude of the RF trapping field is held constant during the analytical scan stage.

Generally, the process illustrated in FIG. 4 may be repeated a desired number of time to produce and analyze successive generations of product ions. For example, in the next iteration, daughter ions produced in the preceding iteration may be isolated as parent ions and undergo CID to produce granddaughter ions. The granddaughter ions may then be analytically scanned, or alternatively isolated as parent ions and undergo CID to produce great-granddaughter ions, and so on.

Figure 5:
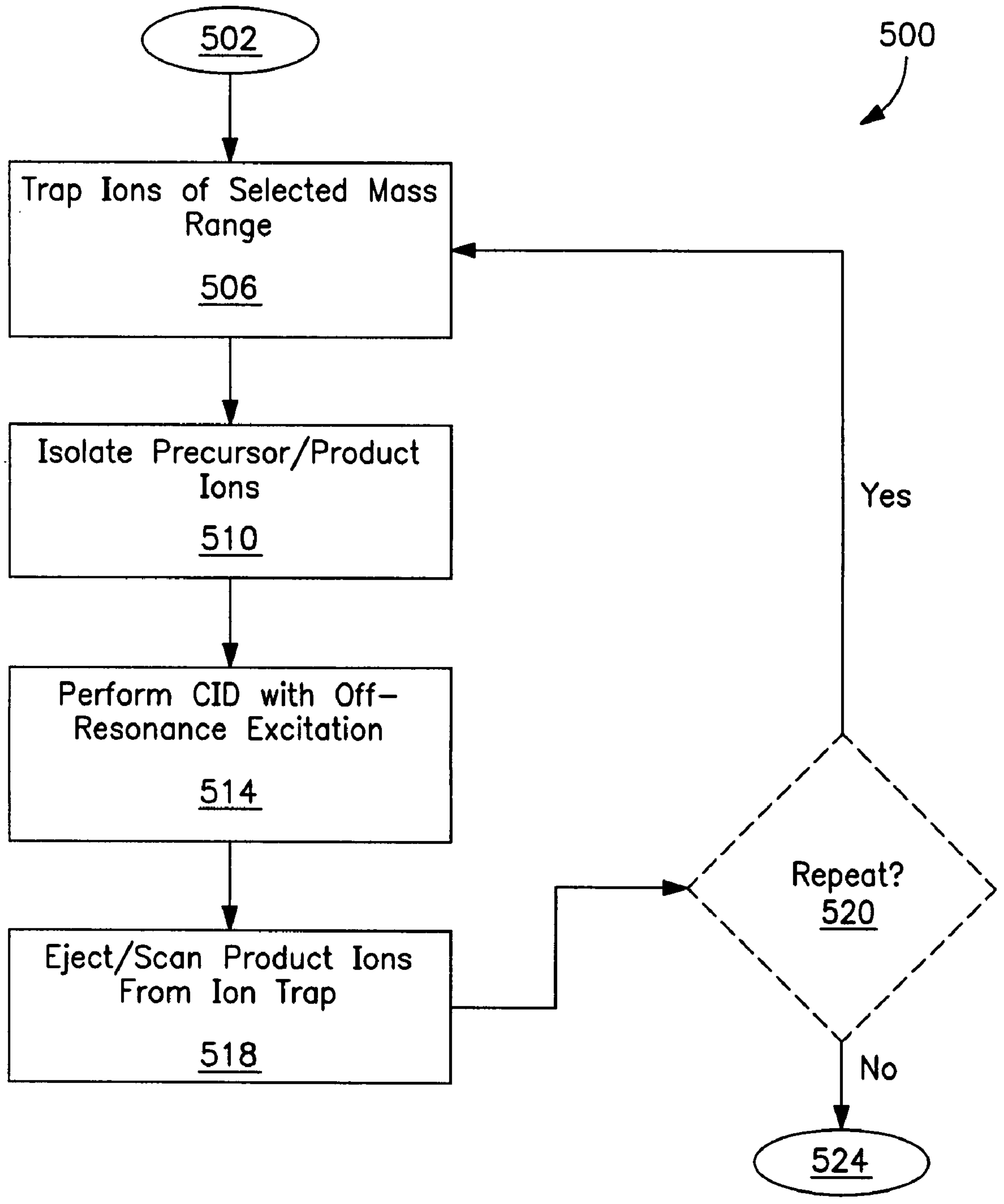
FIG. 5 is a flow diagram illustrating methods in accordance with implementations described in the present disclosure.

FIG. 5 is a flow diagram 500 illustrating examples of methods for exciting ions under off-resonance conditions. The method may entail applying trapping and supplemental fields to an electrode structure of either 3-D or 2-D geometry such as, for example, any of the electrode structures 200 and 300 described above. The flow diagram 500 may also represent an apparatus or system capable of performing the method. The apparatus or system may include devices, circuitry and other hardware, as well as software.

The method begins at 502, where any suitable preliminary steps may be taken, such as performing external or internal ionization as needed for providing ions in the electrode structure, introducing a gas or gases for collisional cooling and/or CID, eliminating ions of no analytical value, pre-scanning, performing calibration, and the like. At block 506, ions of a selected mass range of interest are trapped in the electrode structure. For example, an RF voltage may be applied to one or more electrodes of the electrode structure as needed to generate a quadrupolar (or otherwise symmetrical or near-symmetrical) RF trapping field having a desired spatial form and function. As described above, the trapping field also includes one or more higher-order multipole components in combination with the quadrupolar component. The higher-order multipole component or components may be mechanically generated and/or electrically generated. At block 510, more or more precursor (e.g., parent) ions (or in the case of subsequent iterations, product ions such as daughter ions, granddaughter ions, etc.) of a mass or mass range of interest are isolated by any suitable technique. For example, the technique selected for isolation may entail changing one or more parameters of the RF trapping field, imposing additional fields that supplement the RF trapping field, applying additional signals to the electrode structure, etc. At block 514, once the ion or ions of interest have been isolated in the electrode structure, a CID process is performed by employing one of the methods described above that entails the use of an off-resonance AC waveform in combination with the nonlinear trapping field. The CID process results in the dissociation or fragmentation of the precursor ion or ions into one or more product ions. Upon completion of the CID stage, the process may end at 524, where any suitable succeeding steps may be taken, such as mass-scanning, generating a mass spectrum, and the like.

Optionally, as indicated at block 518, the process may continue by performing any suitable technique for ejecting or scanning the product ions from the electrode structure. As examples, the product ions may be ejected via a mass instability technique or a resonant excitation technique. As a further example, the product ions may be ejected via an off-resonance technique.

As another option, as indicated at the decision block 520, one or more steps of the above-described process may be repeated as desired to effect successive iterations of dissociation and mass analysis. For example, the operating parameters of the electrode structure may be set to trap and isolate a product ion or ions of interest, which may then be dissociated to produce a next generation of product ions. The off-resonance CID technique of the invention may be employed for each iteration of CID if desired. The method illustrated in FIG. 5 may thus be repeated as desired to produce an nth generation of product ions. For each iteration, depending on the outcome of the determination made at block 520, the process either returns to block 506 (or block 510) or ends at 524 where any suitable succeeding steps may be taken, such as mass scanning, generating a mass spectrum, and the like.

As noted above, FIG. 5 may represent an example of an apparatus, device, instrument or system 500 for performing the illustrated method. Accordingly, the blocks 506-518 may be considered as depicting one or more means or structures for performing the functions or steps corresponding to those blocks 506-518 and described above. Examples of apparatus, devices, instruments, and systems capable of implementing these functions are described above in conjunction with FIGS. 1-4.

It will be understood that the methods and apparatus described in the present disclosure may be implemented in an MS system 100 as generally described above and illustrated in FIG. 1 by way of example. The present subject matter, however, is not limited to the specific MS system 100 illustrated in FIG. 1 or to the specific arrangement of circuitry and components illustrated in FIG. 1. Moreover, the present subject matter is not limited to MS-based applications.

The subject matter described in the present disclosure may also find application to ion traps that operate based on Fourier transform ion cyclotron resonance (FT-ICR), which employ a magnetic field to trap ions and an electric field to eject ions from the trap (or ion cyclotron cell). The subject matter may also find application to static electric traps. Apparatus and methods for implementing these ion trapping and mass spectrometric techniques are well-known to persons skilled in the art and therefore need not be described in any further detail herein.

It will be further understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for exciting a precursor ion in an ion trap, the method comprising:

trapping the precursor ion in a nonlinear trapping field including a quadrupolar field and a multipole field, the quadrupolar field generated by applying a radio-frequency (RF) trapping voltage to an electrode structure of the ion trap at an RF trapping amplitude and RF trapping frequency;

applying a supplemental alternating-current (AC) voltage to the electrode structure at a supplemental AC amplitude and supplemental AC frequency, the supplemental AC frequency differing from the secular frequency of the precursor ion by an offset amount insufficient for collision induced dissociation of the precursor ion for allowing sweeping of the secular frequency towards the supplemental AC frequency to result in collision induced dissociation of the precursor ion; and adjusting the ion secular frequency by adjusting at least one of a plurality of operating parameters of the ion trap, the operating parameters including the RF trapping amplitude, the RF trapping frequency, and the supplemental AC frequency, whereby the precursor ion absorbs energy from the supplemental AC voltage sufficient to undergo collision-induced dissociation (CID) without being in resonance with the supplemental AC voltage.

2. The method of claim 1, wherein the supplemental AC voltage is applied to the electrode structure of three-dimensional geometry.

3. The method of claim 1, wherein the supplemental AC voltage is applied to the electrode structure of two-dimensional geometry.

4. The method of claim 1, including superposing the multipole field on the quadrupolar field by applying the RF trapping voltage to the electrode structure deviating from an ideal quadrupolar arrangement.

5. The method of claim 1, including superposing the multipole field on the quadrupolar field by applying an auxiliary voltage to the electrode structure in addition to the supplemental AC voltage.

6. The method of claim 1, wherein the multipole field includes a multipole field component having strength of 1% of the quadrupolar field or greater.

7. The method of claim 1, wherein the multipole field causes the secular frequency of the precursor ion to be increased with increasing distance of the precursor ion from a center of the nonlinear trapping field.

8. The method of claim 1, wherein the multipole field causes the secular frequency of the precursor ion to be decreased with increasing distance of the precursor ion from a center of the nonlinear trapping field.

9. The method of claim 1, wherein the supplemental AC amplitude ranges from 0.01% to 1% of the RF trapping amplitude.

10. The method of claim 1, wherein the supplemental AC frequency is less than the secular frequency, and adjusting includes ramping the RF trapping amplitude downward.

11. The method of claim 1, wherein the supplemental AC frequency is greater than the secular frequency, and adjusting includes ramping the RF trapping amplitude upward.

12. The method of claim 1, wherein adjusting includes sweeping the supplemental AC frequency.

13. The method of claim 1, wherein adjusting includes sweeping the RF trapping frequency.

14. The method of claim 1, wherein adjusting causes the precursor ion to fragment into product ions, and the method further includes analytically scanning the product ions out of the ion trap.

15. The method of claim 1, further including repeating, for a product ion produced from dissociation of the precursor ion, the steps of trapping in the nonlinear trapping field, applying the supplemental AC voltage, and adjusting at least one of the operating parameters.

16. An ion trap for performing collision-induced dissociation (CID) on a precursor ion, the ion trap comprising:

a plurality of electrodes defining an interior space therein and forming an electrode structure;

first circuitry configured to apply a radio-frequency (RF) trapping voltage to the electrode structure at an RF trapping amplitude and RF trapping frequency to generate a quadrupolar trapping field;

means for superposing a multipole field on the quadrupolar trapping field to generate a nonlinear trapping field;

second circuitry configured to apply a supplemental alternating-current (AC) voltage to the electrode structure at a supplemental AC amplitude and supplemental AC frequency, the supplemental AC frequency differing from the secular frequency of the precursor ion by an offset amount insufficient to undergo CID on the precursor ion for allowing sweeping of the secular frequency towards the supplemental AC frequency; and third circuitry configured to adjust the ion secular frequency by adjusting at least one of a plurality of operating parameters of the ion trap, the operating parameters including the RF trapping amplitude, the RF trapping frequency, and the supplemental AC frequency, such that the precursor ion absorbs energy from the supplemental AC voltage sufficient to undergo CID when the secular frequency is swept toward the supplemental AC frequency without being in resonance with the supplemental AC voltage.

17. The ion trap of claim 16, wherein the means for superposing the multipole field includes a plurality of electrodes of the electrode structure deviating from an ideal quadrupolar arrangement.

18. The ion trap of claim 16, wherein the means for superposing the multipole field includes fourth circuitry configured to apply an auxiliary voltage to the electrode structure in addition to the supplemental AC voltage.

19. The ion trap of claim 16, wherein the means for superposing the multipole field includes means for superposing a multipole field component having a strength of about 1% of the quadrupolar field or greater, and the offset amount ranges from 0.5 kHz to 5 kHz.

* * * * *